United States Patent
Kim et al.

(10) Patent No.: US 10,620,766 B2
(45) Date of Patent: Apr. 14, 2020

(54) MOBILE TERMINAL AND METHOD FOR CONTROLLING THE SAME

(71) Applicant: LG ELECTRONICS INC., Seoul (KR)

(72) Inventors: Yongkil Kim, Seoul (KR); Sungmin Jo, Seoul (KR); Sungmin Ho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/110,457

(22) Filed: Aug. 23, 2018

(65) Prior Publication Data
US 2019/0235660 A1    Aug. 1, 2019

(30) Foreign Application Priority Data

Jan. 26, 2018 (KR) .......................... 10-2018-0010194

(51) Int. Cl.
| | | |
|---|---|---|
| *G06F 3/044* | (2006.01) | |
| *H04M 1/02* | (2006.01) | |
| *G06F 3/041* | (2006.01) | |
| *G06F 1/16* | (2006.01) | |

(52) U.S. Cl.
CPC ............ *G06F 3/044* (2013.01); *G06F 1/1656* (2013.01); *G06F 3/0414* (2013.01); *G06F 3/0416* (2013.01); *H04M 1/0266* (2013.01)

(58) Field of Classification Search
CPC combination set(s) only.
See application file for complete search history.

(56) References Cited

U.S. PATENT DOCUMENTS

| | | | |
|---|---|---|---|
| 9,733,767 B2 | 8/2017 | Shin et al. | |
| 2013/0127776 A1* | 5/2013 | Guard | G06F 3/0412 |
| | | | 345/174 |
| 2015/0185951 A1 | 7/2015 | Akai et al. | |
| 2016/0291796 A1 | 10/2016 | Ho et al. | |
| 2016/0334935 A1 | 11/2016 | Jeon | |
| 2017/0060301 A1* | 3/2017 | Li | G06F 3/044 |
| 2017/0344155 A1* | 11/2017 | Lee | G06F 3/044 |
| 2019/0018527 A1* | 1/2019 | Barel | G06F 3/044 |

* cited by examiner

*Primary Examiner* — Deeprose Subedi
(74) *Attorney, Agent, or Firm* — Birch, Stewart, Kolasch & Birch, LLP

(57) ABSTRACT

A mobile terminal including a touch screen including a display panel; and a controller configured to determine surrounding environment information of the mobile terminal by comparing a variation value of touch data sensed on the touch screen with a reference condition set based on a change in the touch data according to a temperature in an atmospheric environment and an underwater environment, set a touch sensing method for sensing a touch input applied to the touch screen to sensing the touch input using a change in capacitance of the touch screen when the surrounding environment information indicates the mobile terminal is operating in the atmospheric environment, and set the touch sensing method for sensing the touch input applied to the touch screen to sensing the touch input using a pressure change applied to the touch screen when the surrounding environment information indicates the mobile terminal is operating in the underwater environment. Further, the display panel includes a color filter glass, a liquid crystal layer, a touch sensor, and a rear glass sequentially layered on the touch screen.

18 Claims, 12 Drawing Sheets

FIG. 2A
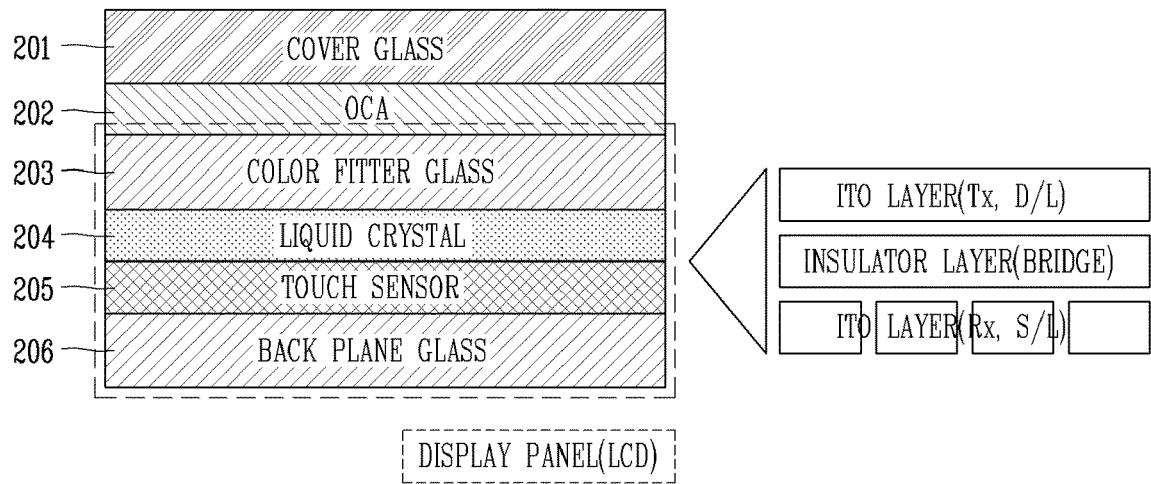
FIG. 2B
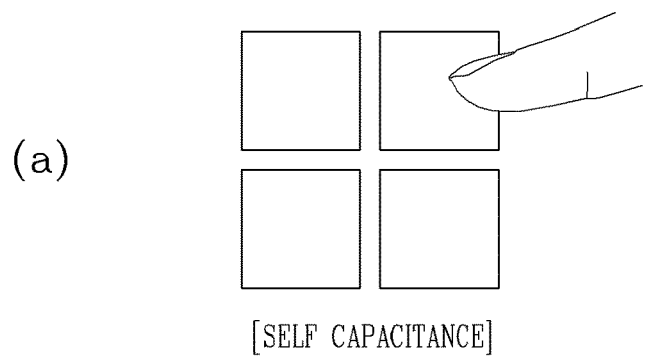
(a)
[SELF CAPACITANCE]
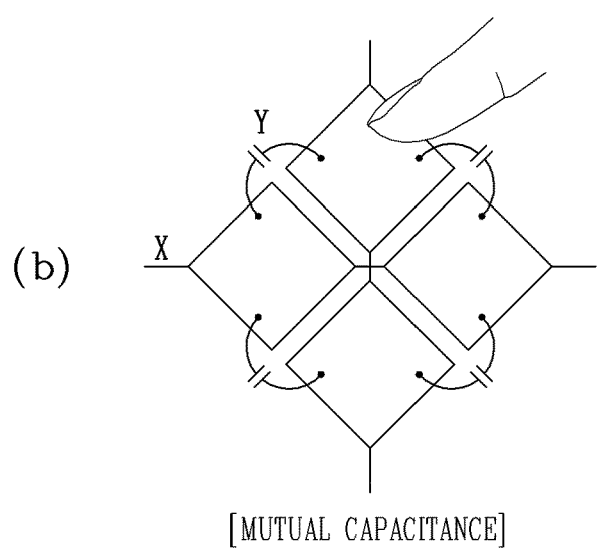
(b)
[MUTUAL CAPACITANCE]

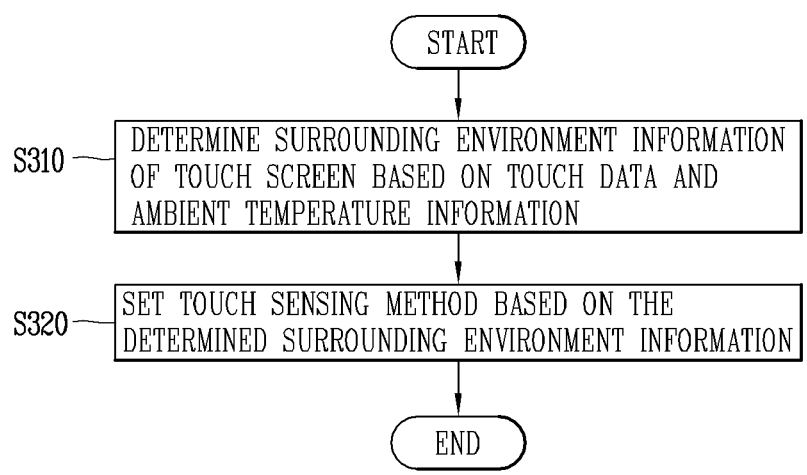

FIG. 4A
(a) 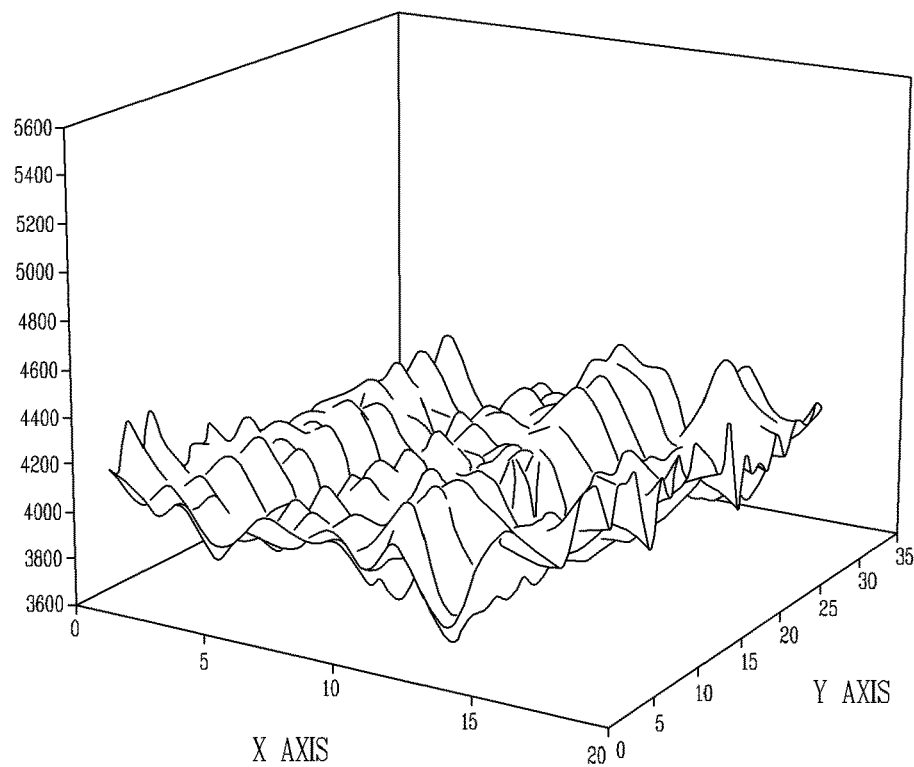
(b) 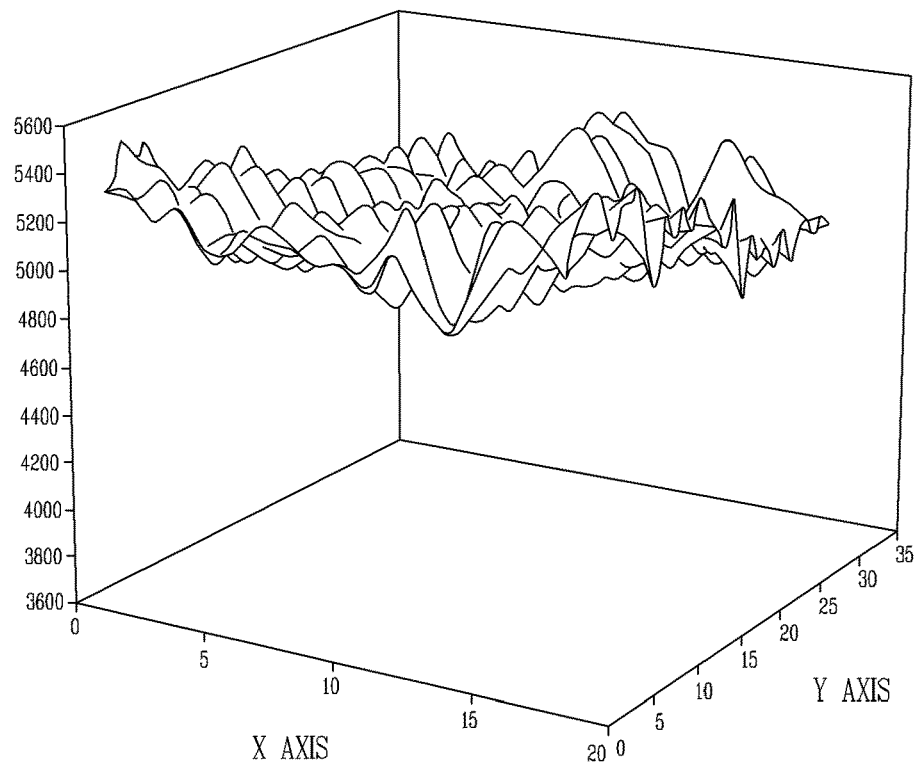

FIG. 4B

[AVG] RAWDATA BY TEMPERATURE

— AIR 10
—·— AIR 20
--- AIR 30
— AIR 40
— WATER 10
—·— WATER 20
— WATER 30
— WATER 40
---- WATER 10(F)
— WATER 40(F)

[ATMOSPHERIC ENVIRONMENT]

(a)

[UNDERWATER ENVIRONMENT]

(b)

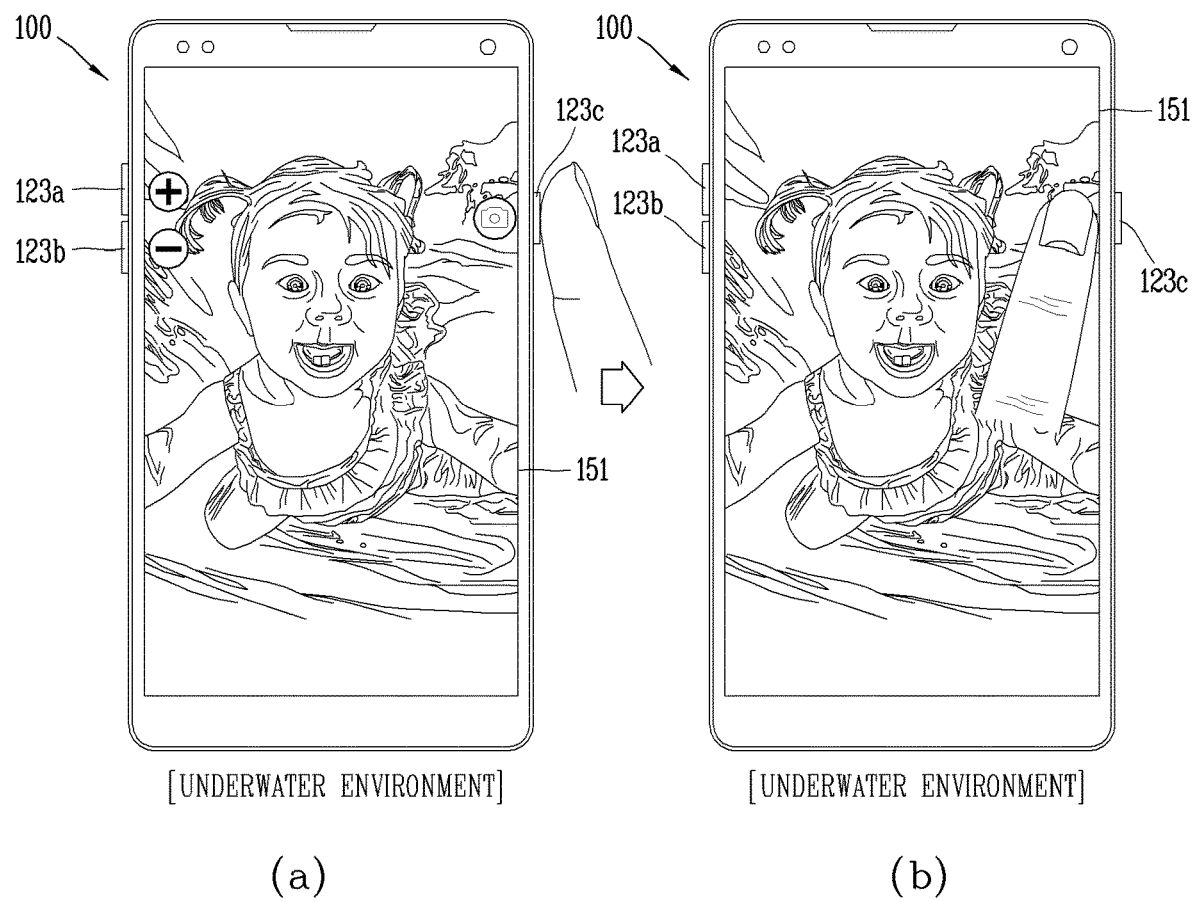

(a)           (b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0010194, filed on Jan. 26, 2018, the contents of which are incorporated by reference herein in their entirety.

BACKGROUND OF THE INVENTION

1. Field of the Invention

The present disclosure relates to a mobile terminal allowing a touch input under water.

2. Description of the Related Art

Terminals may be divided into mobile/portable terminals and stationary terminals. Furthermore, mobile terminals may be divided into handheld terminals and vehicle mounted terminals.

The functions of mobile terminals have been diversified. For example, the functions include data and voice communication, photographing and video shooting through a camera, voice recording, music file playback through a speaker system, and displaying an image or video on a display unit. Some terminals further include an electronic game play function or perform a multimedia player function. In particular, in recent years, mobile terminals can receive multicast signals that provide visual content such as broadcast, video or television programs.

As it becomes multifunctional, for example, such a terminal can capture still images or moving images, play music or video files, play games, receive broadcast and the like, so as to be implemented as an integrated multimedia player. In order to support and enhance the functions of the terminal, the improvement of structural or software elements of the terminal may be taken into consideration.

In recent years, as the use of mobile terminals has rapidly increased, environments using mobile terminals have been diversified. In particular, the needs of users who want to use electronic devices even in an underwater environment have increased. Reflecting these needs, in recent years, waterproof phones equipped with a waterproof function have emerged. However, for a terminal using an electrostatic touch method, even though it is equipped with a waterproof function, there is a restriction on the use of a mobile terminal because touch input in water is not allowed.

SUMMARY OF THE INVENTION

Accordingly, one object of the present disclosure is to provide a mobile terminal allowing an underwater touch.

Another object of the present disclosure is to improve the accuracy of a touch input in an underwater environment.

The present disclosure may include a touch screen in which a touch sensor and a display panel are integrally formed, and a controller configured to determine the surrounding environment information of the touch screen, and set a touch sensing method for sensing a touch input applied to the touch screen based on the determined surrounding environment information of the touch screen, wherein a color filter glass, liquid crystals, a touch sensor, and a rear glass are sequentially layered on the touch screen to form a display panel, and the touch sensing method comprises a first method of sensing a touch using a change in capacitance of the touch screen and a second method of sensing a touch using a pressure change applied to the touch screen, and the controller compares a variation value of touch data sensed on the touch screen with a reference condition for determining the surrounding environment information to determine a surrounding environment of the touch screen, and the reference condition is set in consideration of a change in touch data according to a temperature in an atmospheric environment and an underwater environment.

There is disclosed a method of controlling a mobile terminal having a touch screen in which a touch sensor and a display panel are integrally formed according to another embodiment of the present disclosure, and the method may include determining the surrounding environment of the touch screen, and setting a touch sensing method for recognizing a user input applied to the touch screen based on the determined surrounding environment, wherein said determining the surrounding environment of the touch screen further includes measuring frame data which is a set of touch data of a plurality of nodes constituting the touch screen according to preset intervals, determining whether or not frame data measured at the preset intervals satisfies a reference condition, and determining the surrounding environment of the touch screen as an underwater environment when the frame data satisfying the reference condition are consecutively arranged above a preset number, and wherein the touch sensing method includes a first method of sensing a touch using a change in capacitance of the touch screen and a second method of sensing a touch using a pressure change applied to the touch screen, and the reference condition is set in consideration of a temperature change in an atmospheric environment and an underwater environment.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2A is a conceptual view illustrating a touch screen panel of an in-cell type touch screen;

FIG. 2B is a conceptual view illustrating a mutual capacitance type and a self-capacitance type;

FIG. 3 is a flowchart illustrating a method of sensing an underwater touch input in a mobile terminal according to the present disclosure;

FIG. 4A is a graph illustrating touch data in an underwater environment and an atmospheric environment;

FIG. 4B is a graph illustrating touch data by temperature in an underwater environment and an atmospheric environment;

FIGS. 7A through 8 are conceptual views illustrating a method of providing a user interface when executing an image capture function in an underwater environment.

DETAILED DESCRIPTION OF THE INVENTION

Figure 1:
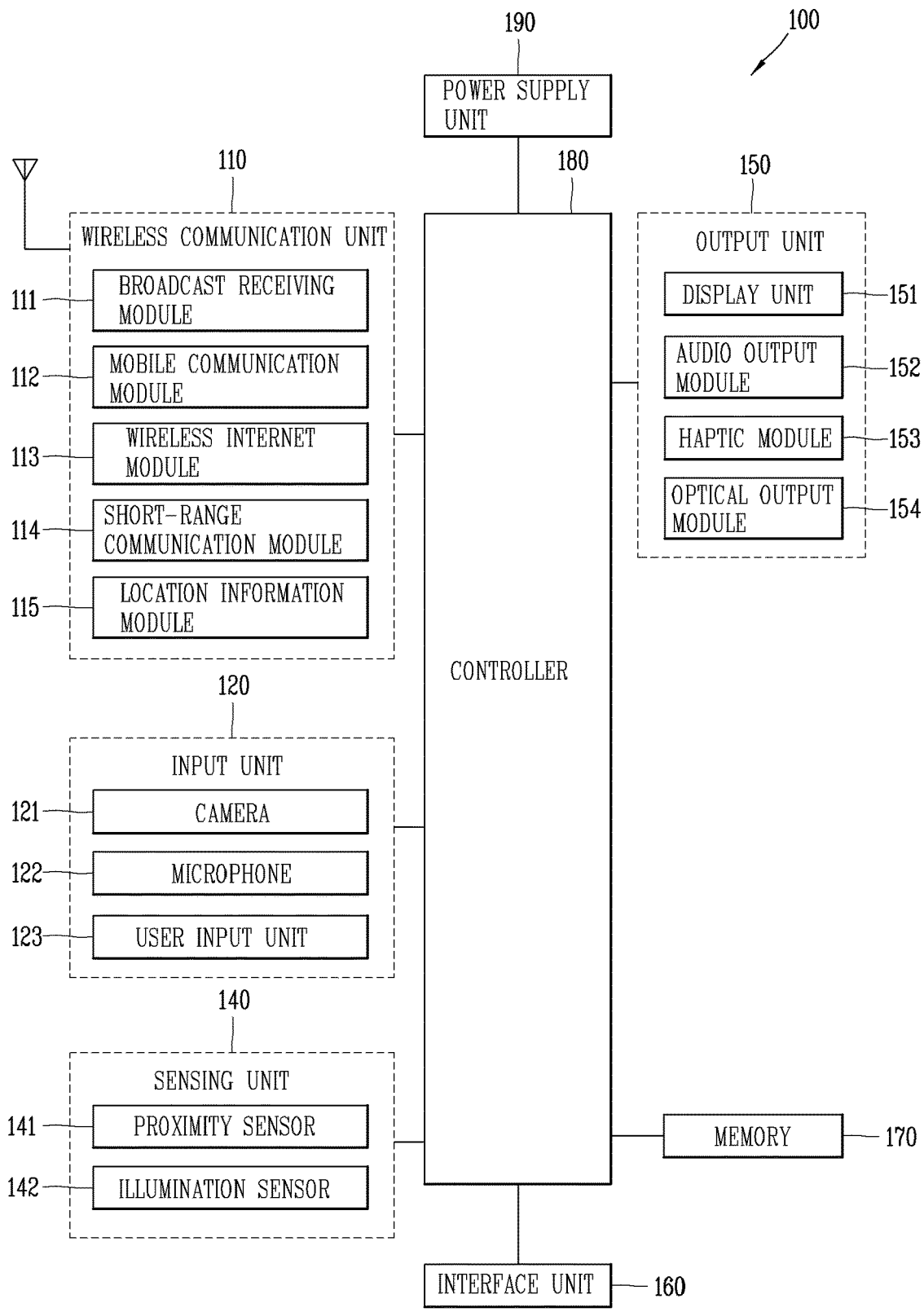
FIG. 1 is a block diagram illustrating a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings.

Although the terms first, second, etc. may be used herein to describe various elements, these elements should not be limited by these terms. These terms are generally only used to distinguish one element from another.

When an element is referred to as being "connected with" another element, the element can be directly connected with the other element or intervening elements may also be present. On the contrary, when an element is "directly connected" or "directly linked" to another element, it should be understood that any other element is not existed therebetween.

A singular representation may include a plural representation as far as it represents a definitely different meaning from the context. Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs), and the like. However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

FIG. 1 is a block diagram illustrating a portable electronic device related to the present disclosure. Referring to FIG. 1, the mobile terminal 100 may include a wireless communication unit 110, an input unit 120, a sensing unit 140, an output unit 150, an interface unit 160, a memory 170, a controller 180, a power supply unit 190, and the like. Implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

Furthermore, the controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.). Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which can exchange data with the mobile terminal 100 (or to like data with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, acquired by an image sensor in a video phone call or image capturing mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

Further, the sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may also be categorized as a proximity sensor.

Further, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor. Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like. The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be terminated as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power input from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a state of the mobile terminal meets a preset condition.

Furthermore, the controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Hereinafter, an in-cell structure of a touch screen in a mobile terminal according to the present disclosure will be described. In particular, FIG. 2A is a conceptual view illustrating a touch screen panel of an in-cell type touch screen, and FIG. 2B is a conceptual view illustrating a mutual capacitance type and a self-capacitance type.

A touch screen 151 according to the present disclosure may further include a touch screen panel (TSP). The touch screen panel (TSP) includes a touch panel, a controller IC, driver software, and is an input device for recognizing an operation of pressing or touching a touch screen with a finger or a pen. The touch panel includes a top plate and a bottom plate on which a transparent electrode (Indium Tin Oxide) is deposited, and performs the role of sensing a position where a signal is generated due to a change in electrical capacity on the touch screen, and transmitting the position to the controller IC.

The controller IC converts an analog signal transmitted from the touch panel into a digital signal and processes it into coordinate information to be displayed on the touch screen. Further, a driver SW controls the digital signal received from the controller IC in a form suitable for each system of the touch panel.

Such a touch screen panel may be divided into a resistance film type, a capacitive type, an ultrasonic type, an infrared type, an optical type, and the like according to application technology. In the present disclosure, a capacitive type touch screen panel will be used, and hereinafter, a structure of a capacitive type touch screen panel will be described.

According to the capacitive type touch screen panel, a special conductive metal can be coated on both sides of a substrate constituting a touch sensor of the touch screen to form a transparent electrode (ITO). Furthermore, according to a capacitive type touch screen panel, a predetermined amount of current flows on a glass surface, thereby forming a potential difference between the conductors. Therefore, according to the capacitive type touch screen panel, a capacitance change is caused by a user's touch to a glass surface, and a change point of the capacitance can be detected to recognize a touch input.

The capacitive type touch screen panel may be divided into various types according to the position, material, processing method, and the like of a layer on which the electrodes are formed. For example, the capacitance type touch screen can be divided into a glass type in which electrodes are formed on a glass substrate, a film type in which electrodes are formed in plastic or film, and an integrated type in which electrodes are integrated with a display panel. In addition, the glass type and the film type can be divided into an add-on method in which an additional electrode layer is required between the display panel and the cover glass, and a one glass solution method in which electrodes are implemented on the cover glass. In the present disclosure, an in-cell method may be used among the integrated methods.

Referring to FIG. 2A, a cover glass 201, an optical clear adhesive (OCA) 202, a color filter glass 203, liquid crystals 204, a touch sensor 205, and a back plane glass 206 are sequentially layered on an in-cell type touch screen panel according to the present disclosure. In other words, the in-cell type touch screen panel according to the present disclosure can be layered in a form that a touch sensor is included in the display panel.

The touch sensor 205 includes a driving line (Tx electrode) and a sensing line (Rx electrode) separately, and the driving line and the sensing line can be disposed with an insulator therebetween. The driving line (Tx electrode) and the sensing line (Rx electrode) can be a thin film that forms a transparent electrode with a compound of indium and tin oxide. The driving line can also be formed to transmit a pulse signal, and the sensing line can be formed to receive a pulse signal.

According to the in-cell method, the touch sensor 205 is formed on a rear surface of the liquid crystal display, and an additional substrate for the touch sensor 205 may not be required, thereby having an advantage that the touch sensor 205 is thin in thickness and light in weight. Such an in-cell type touch screen panel can sense a touch input by either one of self-capacitance type or mutual capacitance type.

As illustrated in FIG. 2B(a), the self-capacitance type is a method of separately sensing a change in capacitance of the x electrode and the y electrode for touch recognition. According to the self-capacitance type, a touch input can be sensed by a method of setting a capacitance of the electrode itself being sensed to an initial value, and then recognizing a change in electrostatic capacitance which is changed by a touch. At this time, the self-capacitance type can recognize the touch position of the touch input through scanning the x electrode line and the y electrode line, respectively.

Referring to FIG. 2B(b), the mutual capacitance type is a method of sensing a change in capacitance formed between the x electrode and the y electrode for touch recognition. More specifically, the mutual capacitance type is a method of sensing a change in capacitance so an electrical field generated from the Tx (transmission line) electrode senses a decrease in the mutual capacitance between the Tx and Rx (receiving line) electrodes while moving to a touch object subjected to the touch, and transfer a Tx signal to the Rx electrode by charge coupling between the Tx electrode and the Rx electrode.

In the present disclosure, it is assumed that a touch panel recognizing a touch input is used in a self-capacitance manner, but the same may be applied to a touch panel using a mutual capacitance type.

Figure 4C:
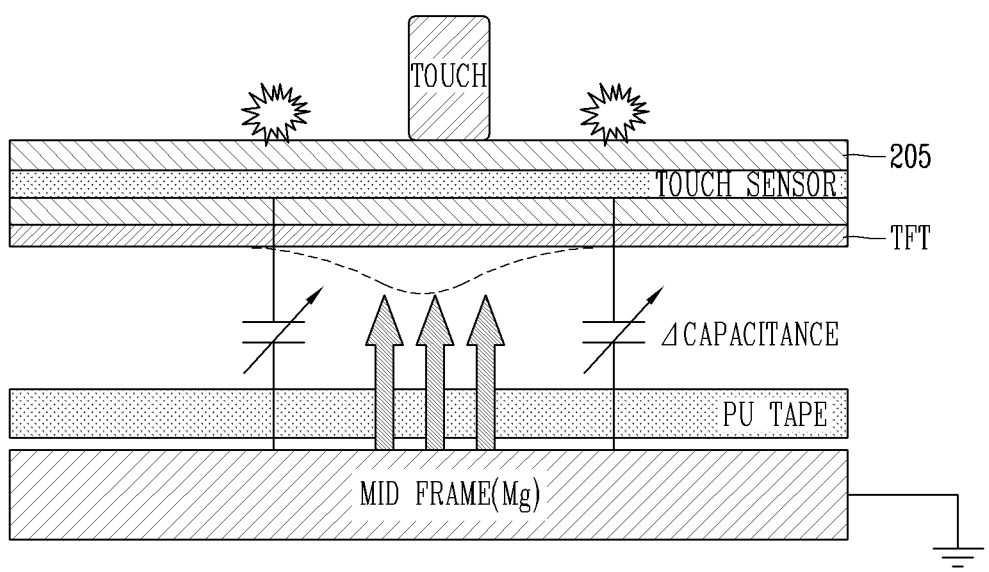
FIG. 4C is a conceptual view illustrating a shape of sensing a pressure type user input on a touch screen panel of a mobile terminal according to the present disclosure.

Hereinafter, a method of sensing an underwater touch input in a mobile terminal according to the present disclosure will be described in detail with reference to the drawings. In particular, FIG. 3 is a flowchart illustrating a method of sensing an underwater touch input in a mobile terminal according to the present disclosure. In addition, FIG. 4A is a graph illustrating touch data in an underwater environment and an atmospheric environment, FIG. 4B is a graph illustrating touch data by temperature in an underwater environment and an atmospheric environment, and FIG. 4C is a conceptual view illustrating a shape of sensing a pressure type user input on a touch screen panel of a mobile terminal according to the present disclosure.

Referring to FIG. 3, the controller 180 of the mobile terminal 100 determines the surrounding environment information of the touch screen based on the touch data and the surrounding temperature information of the touch screen (S310). The controller 180 can detect whether or not the surrounding environment of the touch screen is an underwater environment based on the touch data and the surrounding temperature information sensed by the touch screen panel. The touch data may be data such as current and voltage flowing through the touch screen panel, and electrical signal data released from the touch screen panel.

In addition, the touch data sensed in the atmospheric environment and the underwater environment may be changed. For example, referring to FIG. 4A(a), in an atmospheric environment, raw data having an average value of a first average value can be detected on a touch screen panel to which no touch input is applied. On the contrary, referring to FIG. 4A(b), in an underwater environment, raw data having a second average value larger than the first average value can be detected on a touch screen panel to which no touch input is applied. This is because a change in capacitance is largely detected on the touch screen panel due to water having conductivity, and this phenomenon is referred to as a saturation phenomenon of capacitance. Accordingly, when the surrounding environment of the touch screen is an underwater environment, the controller 180 can recognize that a touch input is applied to the entire area of the touch screen.

Therefore, the controller 180 can determine the surrounding environment of the touch screen using the characteristic information of the touch data in the atmospheric environment and the underwater environment. For example, when the touch data satisfies a reference condition, the controller 180 can determine it as an underwater environment. The reference condition may be an average and minimum value condition of the variation values of the touch data in the underwater environment and the atmospheric environment.

Specifically, the controller 180 can measure a variation value of the touch data at preset intervals or in real time. Here, the variation value of the touch data may be an absolute value of the difference value of the touch data measured every measurement period. For example, when the touch data is measured at a first time point and the touch data is measured at a second point subsequent to the first point of time, a difference value between the touch data measured at the first and the second points of time, respectively, may be determined as a variation value of the touch data. Alternatively, the controller 180 can set an average value of general touch data in an atmospheric environment to a reference value, and set a difference value between the reference value and the touch data measured at a current point of time to a variation value of the touch data. Setting the variation value of the touch data may be determined by the designer of the electronic device, and both two methods may be applicable to the following description.

The controller 180 can determine whether the surrounding environment of the touch screen is either one of an air environment and an underwater environment based on the variation value of the touch data satisfying the reference condition. For example, when the variation value of the touch data satisfies the reference condition when the surrounding environment is determined as an atmospheric environment, the controller 180 can determine the surrounding environment as an underwater environment. On the contrary, when the variation value of the touch data satisfies the reference condition when the surrounding environment is determined as an underwater environment, the controller 180 can determine the surrounding environment as an atmospheric environment.

Further, the touch data of the touch screen can be measured with different average values according to changes in temperature in an underwater environment and an atmospheric environment. For example, the touch data value can be measured to have a smaller value as the average value decreases as the temperature increases in both the underwater environment and the atmospheric environment.

As a result, in the present disclosure, the reference condition can be set in consideration of a condition that the variation value of the touch data becomes minimum. For example, referring to FIG. 4B, in the present disclosure, a difference value between an average value of the touch data measured at the lowest temperature (−10 degrees) in an atmospheric environment and an average value of the touch data measured at the highest temperature (40 degrees) may be set as a reference condition.

Thus, the present disclosure can accurately detect the underwater environment and the atmospheric environment at all times regardless of an ambient temperature change of the touch screen. The present disclosure can also consider a change in the average value of the touch data when a protective film is attached on the touch screen. For example, a graph indicated by water (f) in FIG. 4B illustrates touch data when a protective film is attached.

As may be seen from the graph, when a protective film is attached on the touch screen, an average value of the touch data may be lower than when the protective film is not attached on the touch screen. Therefore, the present disclosure can set a reference condition in consideration of the attachment state of the protective film.

For example, a difference value between the average value of the touch data when the temperature of the underwater environment is 40 degrees and the average value of the touch data when the temperature of the atmosphere is 10 degrees while attaching a protective film can be reflected on the reference condition. In this instance, for the reference condition, the minimum value of the difference value of the touch data in the underwater environment and the atmospheric environment can be set to 441, and the average value can be set to 666 to distinguish the underwater environment and the atmospheric environment from each other. Accordingly, when a change amount of the average value of the touch data is 666 or more and a minimum value of the difference value of the touch data is 441 or more, the controller 180 can determine that it is an underwater environment.

Also, in the present disclosure, the user can input information on whether or not the protective film is directly attached to the mobile terminal, or the mobile terminal can analyze the touch data of the touch screen panel to determine whether or not the protective film is attached thereto.

The above description describes the reference condition is set in consideration of an environment in which the temperature changes, but the reference condition can vary depending on the ambient temperature. More specifically, the touch data sensed by the touch panel can vary depending on the ambient temperature. A mobile terminal according to the present disclosure can also have a temperature sensor separately, and the controller 180 can sense the ambient temperature of the touch screen through the temperature sensor. The controller 180 can also determine the ambient temperature in real time or at preset intervals.

In addition, the controller 180 can change the reference condition of the touch data for determining whether or not the user is under water based on the surrounding temperature information. For example, referring to FIG. 4B, as the ambient temperature (water or atmosphere) in an underwater environment and an atmospheric environment increases, the average value of touch data decreases. Therefore, the reference condition for determining the underwater environment and the atmospheric environment can be set in consideration of a situation in which a difference between the average value of the touch data when the temperature is the highest in the underwater environment and the average value of the touch data when the temperature is the lowest in the atmospheric environment becomes small. For example, referring to FIG. 4B, a difference value between the average value of the touch data when the temperature of the underwater environment is 40 degrees and the average value of the touch data when the temperature of the atmosphere is 10 degrees can be reflected on the reference condition.

Accordingly, the controller 180 can store the reference condition on the memory 170 by temperature. For example, in the memory 170, for a first temperature, a difference value of the average value of the touch data at the first temperature and the minimum value of the touch data at the first temperature can be stored as the reference condition, and for a second temperature, a difference value of the average value of the touch data at the second temperature and the minimum value of the touch data at the second temperature can be stored as the reference condition.

Furthermore, the first temperature and the reference condition for attaching a protective film and the first temperature and the reference condition for not attaching and the protective film can be stored differently from each other in the memory 170 of the present disclosure. When the mobile terminal determines whether or not a protective film is attached thereto, the controller 180 determines whether or not the protective film is attached using the characteristic information of the touch data previously stored in the memory 170 at the time of attaching the protective film.

The controller 180 can set a touch sensing method based on the determined surrounding environment information (S320). The touch sensing method senses a touch input applied to the touch screen. For example, the touch sensing method in an atmospheric environment of the present disclosure senses a touch input through a change in capacitance of a touch screen due to a user input applied to the touch screen.

In addition, the touch sensing method in an underwater environment of the present disclosure senses a user input through a change in pressure of a touch screen (an air gap change between the touch sensor and an intermediate frame) due to a user input applied to the touch screen.

Referring to FIG. 4C, a touch screen panel according to an embodiment of the present disclosure can generate a gap change between the touch sensor and a ground (GND) electrically connected to the mid-frame according to a pressure of a user input applied to the touch screen. At this time, the controller 180 can detect a slight increase in capacitance due to a gap change to sense a user input applied to the touch screen.

The controller 180 can set the minimum reference levels of the touch sensing method in an atmospheric environment and the touch sensing method in an underwater environment in a different manner. Here, the minimum reference level represents a minimum touch data value (for example, a change value of capacitance provided in the touch sensor) that can be sensed by the touch sensor of the touch screen. For example, when the minimum reference level in an atmospheric environment is a first level, the controller 180 can process touch data having a value smaller than the first level as noise, and only touch data having a value larger than the first level as effective touch data.

Also, the minimum reference level in an underwater environment can be set to be lower than the minimum reference level capable of sensing touch data in an atmospheric environment, in order to sense a slight increase in capacitance due to a gap change. Therefore, in an underwater environment, data processed as noise in an atmospheric environment can be processed as effective touch data.

Therefore, the present disclosure can sense a user input applied on the touch screen without any structural change of the touch screen panel. Furthermore, a touch sensing method in an underwater environment can be recognized even when a user input is applied to the touch screen using a non-conductive object instead of a finger.

As described above, the present disclosure can determine the surrounding environment of the touch screen in consideration of the ambient temperature of the touch screen, thereby improving the accuracy of determining the surrounding environment. In addition, the present disclosure can change a sensing method of a user input applied to the touch screen in an underwater environment, thereby recognizing the user input in an underwater environment without any user input.

Hereinafter, a method for determining an underwater environment in the mobile terminal according to the present disclosure will be described. In particular, FIG. 5A is a flowchart illustrating a method for determining an underwater environment of a touch screen, and FIG. 5B is a flowchart for determining whether or not frame data satisfies a reference condition.

Figure 5A:
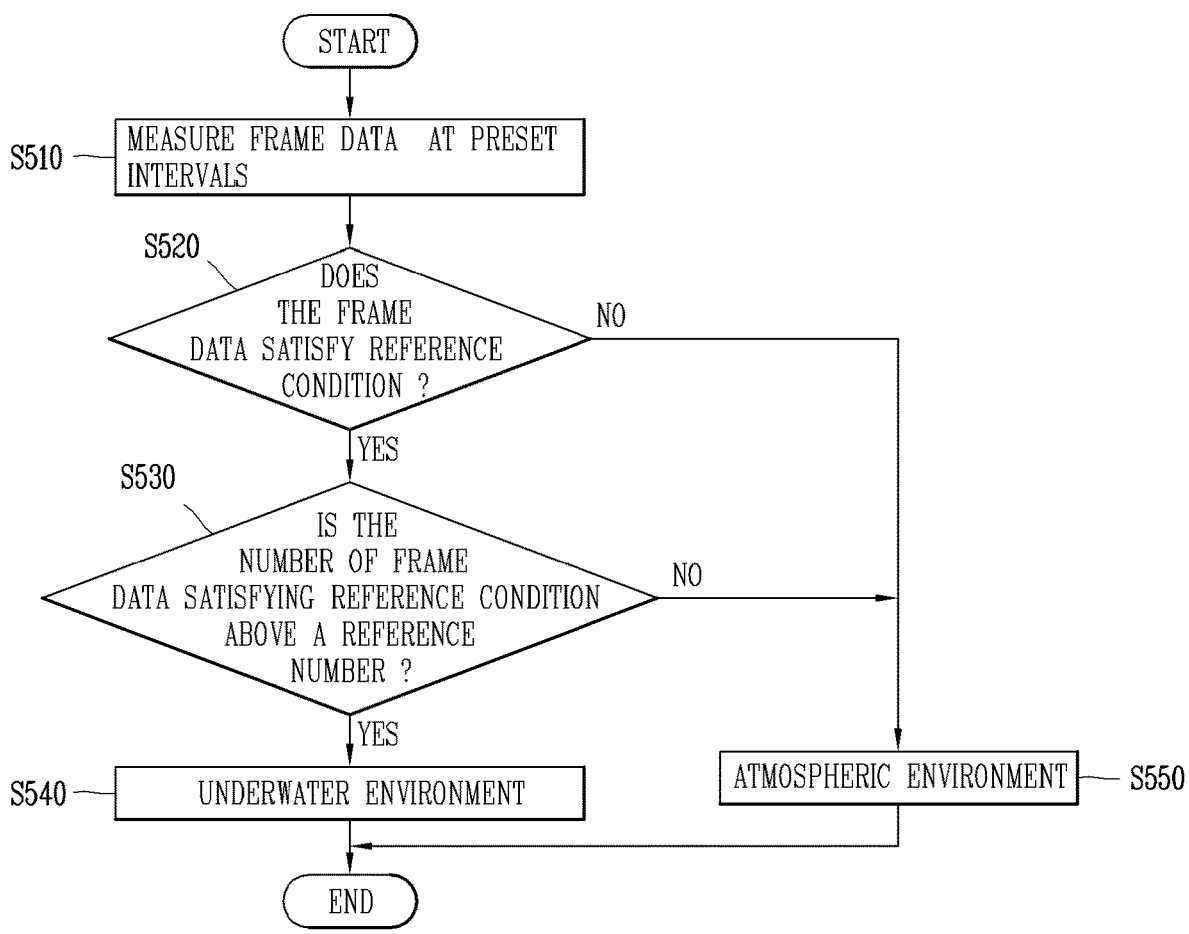
FIG. 5A is a flowchart illustrating a method for determining an underwater environment of a touch screen.
Figure 5B:
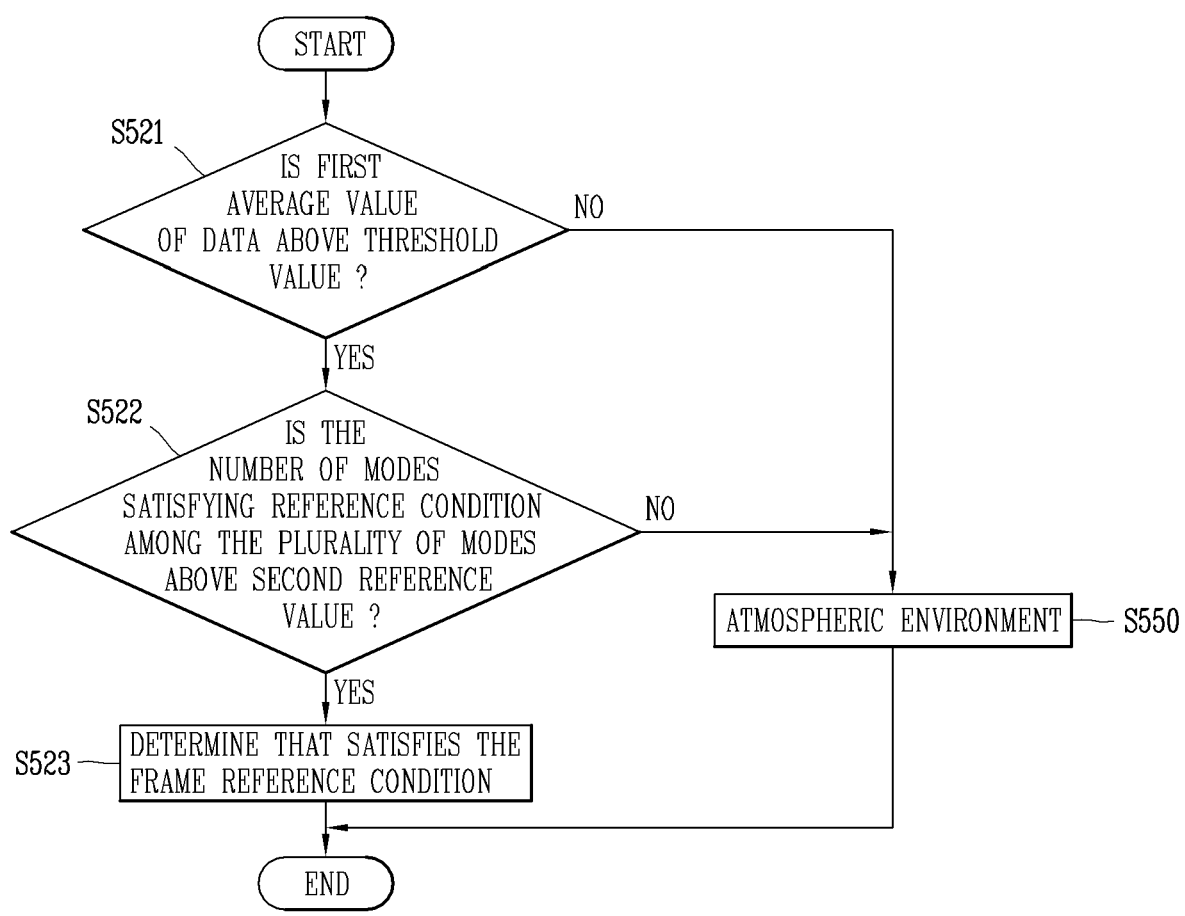
FIG. 5B is a flowchart for determining whether or not frame data satisfies a reference condition.

Referring to FIG. 5A, the controller 180 can measure frame data at preset intervals (S510). The touch screen panel according to the present disclosure may include a plurality of nodes, and the controller 180 can measure touch data from each of the plurality of nodes.

Further, the frame may indicate a set of touch data measured from the plurality of nodes at a specific point of time. In the present disclosure, a set of touch data of a plurality of nodes constituting the frame can be referred to as frame data.

In addition, the controller 180 can measure the frame data at preset intervals. Here, the preset interval can be set to a cycle of 1 second. In addition, the preset interval can be set in various forms by the manufacturer or the user of the mobile terminal. For example, the controller 180 can sequentially measure frame data in order of a first frame, a second frame, and a third frame. At this time, touch data of a plurality of nodes may be included in each of the frames.

The controller 180 can determine whether or not the frame data satisfies the reference condition (S520). In more detail, the controller 180 can determine whether or not the reference condition is satisfied for each of the plurality of frame data measured at the preset intervals. Here, the reference condition may include at least one of an average value of the touch data and a minimum value of the touch data.

In addition, the controller 180 can determine whether the number of frame data satisfying the reference condition is equal to or greater than a reference number (S530). The reference number can be set in advance. When the number of frame data satisfying the reference condition is above the reference number (Yes in S530), the controller 180 can determine that it is an underwater environment (S540). When the frames satisfying the reference condition are continuously detected above the reference number, the controller 180 can determine it as an underwater environment. In other words, the present disclosure may determine it as an underwater environment only when the frame data measured at preset intervals continuously satisfy the reference condition.

On the contrary, when the frame data does not satisfy the reference condition (No in S520) or the frame data satisfying the reference condition is less than the reference number (No in S530), the controller 180 can determine it as an air environment (S550). In addition, when the frames satisfying the reference condition are not continuously measured, the controller 180 can determine it as an atmospheric environment. In other words, when the first frame satisfies the reference condition and the second frame measured subsequent to the first frame does not satisfy the reference condition, the controller 180 can determine it as an atmospheric environment even when the third frame and the second frame measured since then satisfy the reference condition.

Therefore, the present disclosure improves the accuracy of determining the underwater environment. Hereinafter, the step S520 of determining whether or not the frame data satisfies the reference condition will be described in more detail.

First, referring to FIG. 5B, the controller 180 can determine whether or not the average value of the frame data is above a first threshold value (S521). The first threshold value is an average value of touch data sensed in an underwater environment. The average value of the frame data may represent an average value of the touch data of the plurality of nodes constituting the frame.

When the average value of the frame data is above the first threshold value (Yes in S521), the controller 180 can determine whether or not the number of nodes satisfying the reference condition among the plurality of nodes constituting the frame is above a second threshold value (S522). The reference condition may be a condition having touch data above the first threshold value. The controller 180 can also extract at least one node having touch data above the first threshold value among a plurality of nodes. The second threshold may be preset by the manufacturer of the mobile terminal.

In addition, when the number of the extracted nodes is above the second threshold value (Yes in S522), the controller 180 can determine that the frame data satisfies the reference condition (S523). When the average value of the frame data is less than the first threshold value (No in S521) or the number of nodes satisfying the reference condition is equal to or less than the second threshold value (No in S522), the controller 180 can determine that the frame data does not satisfy the reference condition, and determine that it is an atmospheric environment (S550).

In other words, when determining the underwater environment using the touch data of the touch screen panel, the present disclosure can determine it using various conditions rather than determination due to a simple malfunction of the user input, thereby improving the accuracy of determining the underwater environment.

Hereinafter, a method of allowing a mobile terminal according to the present disclosure to provide a user interface in an underwater environment will be described. In particular, FIGS. 6A through 8 are conceptual views illustrating a method of providing a user interface in an underwater environment of a mobile terminal.

When the mobile terminal is placed in an underwater environment, the controller 180 can provide a user interface (UI) in a form optimized in an underwater environment, unlike an atmospheric environment. For example, referring to FIG. 6A, when the touch sensing method is changed in an underwater environment, the controller 180 can display notification information indicating that the mobile terminal operates in an underwater mode on the touch screen.

Figure 6A:
FIGS. 6A through 6B are conceptual views illustrating a method of providing a user interface in an underwater environment of a mobile terminal.
Figure 6B:

In more detail, the underwater mode is an operation state of the mobile terminal operating under the touch sensing method in an underwater environment. Alternatively, as illustrated in FIG. 6B, the controller 180 can display notification information to prevent water from being infiltrated into a hole connected between the outside and the inside of the mobile terminal, in an underwater environment.

Further, in an underwater environment, since the sensing method of the user input is changed to the pressure method, it is difficult to recognize a pressure at an edge of the touch screen in which the pressure change is not so large. Since the edge of the touch screen is in contact with an outer frame of the mobile terminal, the elasticity of the touch screen may be reduced due to the rigidity of the outer frame. As a result, the edge of the touch screen is less likely to change the appearance due to an user input, and therefore, the pressure change is small, and it may be difficult to sense the user input with the pressure method.

Accordingly, when the underwater environment is sensed, the controller 180 can display icons displayed on the edge of the touch screen by moving them to the center region of the touch screen. For example, referring to FIG. 7, when the underwater mode is executed, the controller 180 can display icons 701 and 702 displayed in an edge region of the touch screen in the center region of the touch screen. Therefore, the present disclosure improves the recognition accuracy and user convenience of a touch input in an underwater environment.

Figure 8:
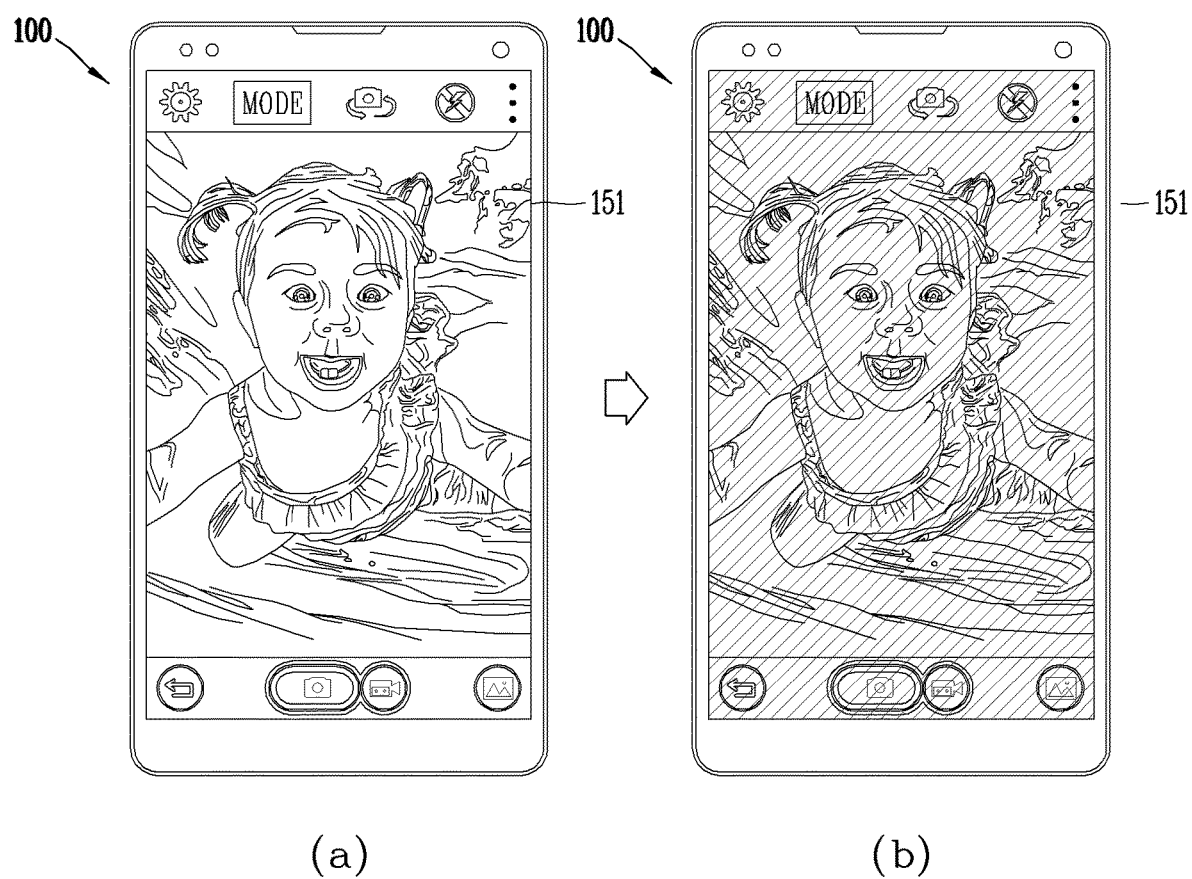

Furthermore, in an underwater environment, an area to which a user input is applied may be wider than an atmospheric environment. Thus, the controller 180 can extend a display interval between the icons displayed on the touch screen. In addition, the controller 180 can display a large display size of the icons displayed on the touch screen. In addition, as illustrated in FIG. 8, the controller 180 can change at least one of the brightness and the color of the touch screen in order to improve the visibility of visual information displayed on the touch screen in an underwater environment.

In the above, a method of changing a user interface of the mobile terminal in an underwater environment has been described. Through this, the present invention improves user convenience in an underwater environment.

Hereinafter, an embodiment of executing an image capture function in an underwater environment in a mobile terminal according to the present disclosure will be described. In particular, FIGS. 7A through 8 are conceptual views illustrating a method of providing a user interface when executing an image capture function in an underwater environment.

The mobile terminal according to the present disclosure can execute an image capture function capable of capturing an image using the camera 121 in an underwater environment. The image capture function captures an image using the camera 121. The controller 180 can activate the camera 121, and receive a preview image through the camera 121 when the image capture function is executed.

The controller 180 can also display the execution screens of an image capture function in the underwater environment and the atmospheric environment in a different manner.

Figure 7A:
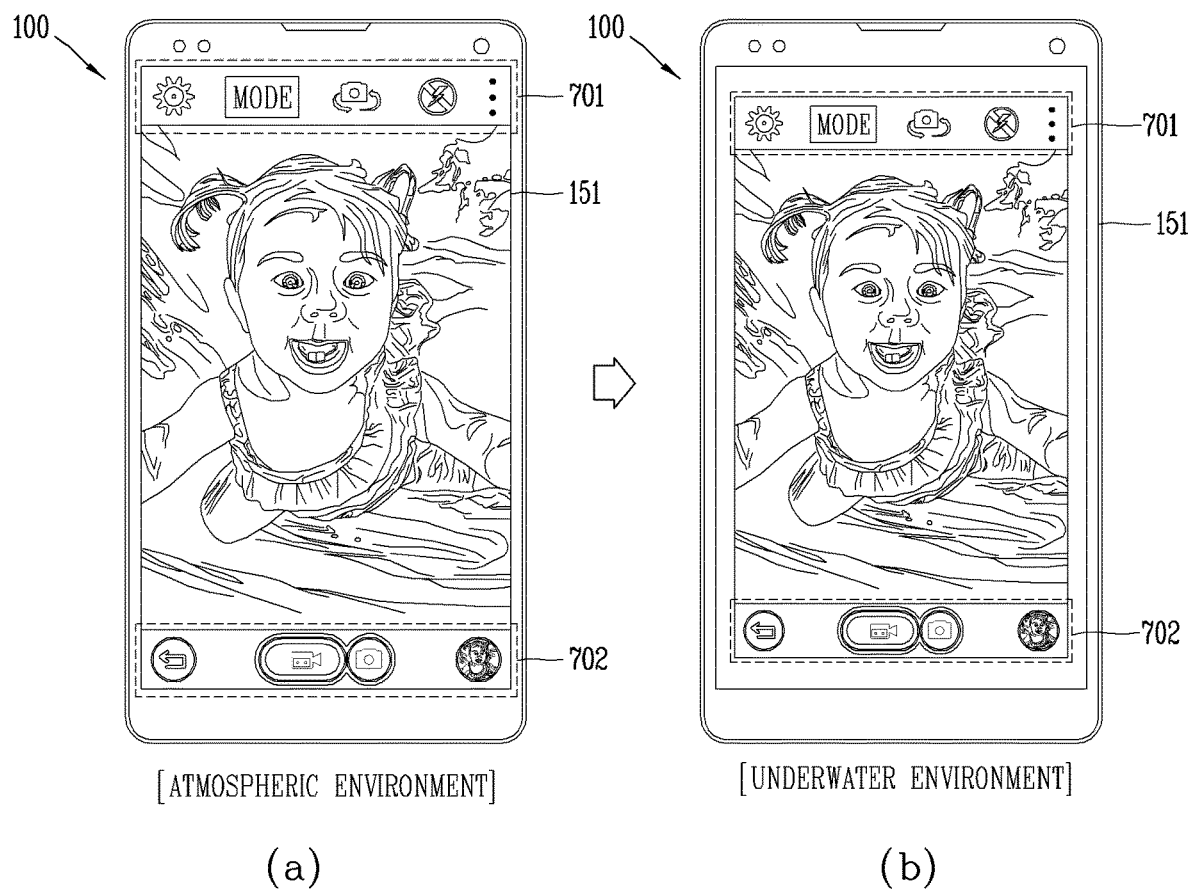

More specifically, as illustrated in FIG. 7A(a), the controller 180 can display a preview image on the touch screen 151 in an atmospheric environment. In addition, the controller 180 can display icons 701, 702 related to image capturing together with the preview image. The icons 701, 702 related to image capturing include an icon for setting an image effect, a camera switch icon, an image capture mode icon, a flash on/off icon, a still image capture icon, a video capture icon, a gallery entry icon, an image capture function end icon, and the like.

Further, as illustrated in FIG. 7A(b), when the image capture function is executed in an underwater environment, the controller 180 can reduce the overall display size of the preview image and function execution icon, and change the display position so as not to be displayed in the edge region on the screen 151. Accordingly, the user can enter a user input through a region other than the edge region of the touch screen 151 where it is difficult to sense a pressure in an underwater environment. Accordingly, the present disclosure improves the operation accuracy of the mobile terminal according to a user input in an underwater environment.

Alternatively, when the image capture function is executed, the controller 180 can set the mobile terminal to control the image capturing function using a physical key button disposed on both sides of the mobile terminal. For example, as illustrated in FIG. 7B(a), the controller 180 can set an image zoom-in function and an image zoom-out function to be performed on volume control keys 123a, 123b, respectively, and set the image capture function to be performed on a power key 123c.

In this instance, as illustrated in FIG. 7B(a), the controller 180 can display a guide icon in a region of the touch screen adjacent to a position disposed with each physical key to allow the user to recognize that a function related to image capturing can be performed using each physical key. For example, an image capture icon can be displayed in an area on the touch screen that is the closest to a position disposed with the power key. Further, when the physical key is associated with the image capture function, a preview image may be displayed in the same form in an underwater environment and the atmospheric environment.

Accordingly, as illustrated in FIG. 7B(b), the controller 180 can perform image capturing in an underwater environment in response to a power key press input. Furthermore, when the image capture function is performed in an underwater environment, the controller 180 can execute an underwater capture mode suitable for the underwater environment. The underwater capture mode may be a mode in which a red filter effect process is performed on a preview image. In the underwater capture mode, the preview image can be displayed on the touch screen with the red filter effect processed, and moreover, the controller 180 can perform image capturing with the red filter effect processed. Therefore, in the present disclosure, it is possible to acquire an image in which the phenomenon that the red color of the image is weakened due to underwater capturing is corrected.

The mobile terminal according to the present disclosure can sense the surrounding environment of the touch screen, and change a touch sensing method to allow touch recognition in the underwater environment when the surrounding environment of the touch screen corresponds to the underwater environment, thereby allowing the control of the terminal in the underwater environment. In addition, the mobile terminal according to the present disclosure can change the touch sensing method according to a temperature change in the underwater environment, thereby improving the accuracy of touch recognition. The mobile terminal according to the present disclosure can also provide a user interface suitable for an underwater environment, thereby enhancing the convenience of use of the terminal in an underwater environment.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
a touch screen including a display panel; and
a controller configured to:

determine surrounding environment information of the
mobile terminal by comparing a variation value of
touch data sensed on the touch screen with a reference
condition set based on a change in the touch data
according to a temperature in an atmospheric environment and an underwater environment,
set a touch sensing method for sensing a touch input
applied to the touch screen to sensing the touch input
using a change in capacitance of the touch screen when
the surrounding environment information indicates the
mobile terminal is operating in the atmospheric environment, and
set the touch sensing method for sensing the touch input
applied to the touch screen to sensing the touch input
using a pressure change applied to the touch screen
when the surrounding environment information indicates the mobile terminal is operating in the underwater
environment,
wherein the display panel includes a color filter glass, a
liquid crystal layer, a touch sensor, and a rear glass
sequentially layered on the touch screen,
wherein the touch screen comprises a plurality of nodes,
and
wherein the controller is further configured to:
measure frame data formed of a set of touch data of the
plurality of nodes at preset intervals,
determine whether or not a variation value of the measured frame data satisfies the reference condition, and
determine the mobile terminal is operating in the underwater environment when the number of frame data
satisfying the reference condition is above a reference
number.

2. The mobile terminal of claim 1, wherein the reference condition is related to at least one of an average value and a minimum value of difference values of the touch data of the touch screen in the atmospheric environment and the underwater environment.

3. The mobile terminal of claim 1, wherein the controller is further configured to:
set the reference condition based on an ambient temperature of the touch screen.

4. The mobile terminal of claim 1, wherein the controller is further configured to:
set the reference condition to a first reference condition when a protective film is attached to the touch screen and set the reference condition to a second reference condition when the protective film is not attached on the touch screen.

5. The mobile terminal of claim 1, wherein the controller is further configured to:
determine the surrounding environment information at preset intervals.

6. The mobile terminal of claim 1, wherein the controller is further configured to:
determine whether or not an average value of the variation values of the frame data is above a first threshold value,
extract at least one node satisfying the reference condition associated with a node among a plurality of nodes included in the frame data when the average value of the variation values of the frame data is above the first threshold value, and
determine that the frame data satisfies the reference condition when the extracted at least one node is above a reference number.

7. The mobile terminal of claim 1, wherein the controller is further configured to:
change a display position of a graphic object on the touch screen to a central region on the touch screen when the surrounding environment indicates the mobile terminal is operating in the underwater environment.

8. The mobile terminal of claim 1, wherein the controller is further configured to:
display notification information for protecting external input/output terminals of the mobile terminal when the surrounding environment of the touch screen indicates the mobile terminal is operating in the underwater environment.

9. The mobile terminal of claim 1, wherein the controller is further configured to:
change a brightness of the touch screen when the surrounding environment indicates the mobile terminal is operating in the underwater environment.

10. The mobile terminal of claim 1, wherein the controller is further configured to:
display notification information notifying the touch sensing method is using the pressure change applied to the touch screen when the surrounding environment of the touch screen indicates the mobile terminal is operating in the underwater environment.

11. The mobile terminal of claim 1, further comprising:
a camera configured to capture an image,
wherein the controller is further configured to:
control the camera to capture the image when a mechanical button on the mobile terminal is pressed or when a graphical object displayed on the touch screen next to the mechanical button is pressed.

12. A method of controlling a mobile terminal, the method comprising:
determining, via a controller of the mobile terminal, surrounding environment information of the mobile terminal by comparing a variation value of touch data sensed on a touch screen including a display panel of the mobile terminal with a reference condition set based on a change in the touch data according to a temperature in an atmospheric environment and an underwater environment;
setting, via the controller, a touch sensing method for sensing a touch input applied to the touch screen to sensing the touch input using a change in capacitance of the touch screen when the surrounding environment information indicates the mobile terminal is operating in the atmospheric environment; and
setting, via the controller, the touch sensing method for sensing the touch input applied to the touch screen to sensing the touch input using a pressure change applied to the touch screen when the surrounding environment information indicates the mobile terminal is operating in the underwater environment,
wherein the display panel includes a color filter glass, a liquid crystal layer, a touch sensor, and a rear glass sequentially layered on the touch screen,
wherein the touch screen comprises a plurality of nodes, and
wherein the method further comprises:
measuring, via the controller, frame data formed of a set of touch data of the plurality of nodes at preset intervals;
determining, via the controller, whether or not a variation value of the measured frame data satisfies the reference condition; and
determining, via the controller, the mobile terminal is operating in the underwater environment when the number of frame data satisfying the reference condition is above a reference number.

13. The method of claim 12, wherein the reference condition is related to at least one of an average value and a minimum value of difference values of the touch data of the touch screen in the atmospheric environment and the underwater environment.

14. The method of claim 12, further comprising:
setting, via the controller, the reference condition based on an ambient temperature of the touch screen.

15. The method of claim 12, further comprising:
setting, via the controller, the reference condition to a first reference condition when a protective film is attached to the touch screen; and
setting, via the controller, the reference condition to a second reference condition when the protective film is not attached on the touch screen.

16. The method of claim 12, further comprising:
determining, via the controller, the surrounding environment information at preset intervals.

17. The method of claim 12, further comprising:
determining, via the controller, whether or not an average value of the variation values of the frame data is above a first threshold value;
extracting, via the controller, at least one node satisfying the reference condition associated with a node among a plurality of nodes included in the frame data when the average value of the variation values of the frame data is above the first threshold value; and
determining, via the controller, that the frame data satisfies the reference condition when the extracted at least one node is above a reference number.

18. The method of claim 12, further comprising:
changing, via the controller, a display position of a graphic object on the touch screen to a central region on the touch screen when the surrounding environment indicates the mobile terminal is operating in the underwater environment.

* * * * *